United States Patent [19]

Beal

[11] Patent Number: 5,419,812

[45] Date of Patent: May 30, 1995

[54] METHOD FOR REGULATING SULFUR DIOXIDE EMISSIONS FROM A RECOVERY FURNACE

[75] Inventor: Allen W. Beal, Mansfield, Mass.

[73] Assignee: The Foxboro Company, Foxboro, Mass.

[21] Appl. No.: 940,012

[22] Filed: Sep. 3, 1992

[51] Int. Cl.$^6$ .................. D21C 11/06; D21C 11/08
[52] U.S. Cl. ............................ 162/198; 162/30.1; 162/263; 423/DIG. 3
[58] Field of Search .............. 162/30.1, 30.11, 31, 162/198, 263; 422/62, 110, 105, 108; 423/DIG. 3, DIG. 5, DIG. 6; 122/448.1

[56] References Cited

U.S. PATENT DOCUMENTS

| | | | |
|---|---|---|---|
| 4,683,841 | 8/1987 | Andersson et al. | 162/30.1 |
| 4,768,469 | 9/1988 | Iizuka et al. | 122/448.1 |

OTHER PUBLICATIONS

Terry Adams, "Kraft Recovery Boiler Physical & Chem Processes", 1988, API, pp. 34–47, 234–241.

*Primary Examiner*—W. Gary Jones
*Assistant Examiner*—Dean T. Nguyen
*Attorney, Agent, or Firm*—Fish & Richardson

[57] ABSTRACT

In general, the invention features method for regulating sulfur dioxide emissions from the recovery furnace of a Kraft paper mill. The method includes:

(a) identifying predetermined responses, wherein each said response either permits or inhibits adjustment of black liquor temperature and wherein adjustment of black liquor temperature is an increase or decrease in temperature, each said response being associated with a particular potential combination of the status of upper furnace temperature, hot zone temperature, and sulfur dioxide concentration within said furnace, said status being increasing, decreasing or unchanged;

(b) periodically measuring upper furnace temperature, hot zone temperature, and sulfur dioxide concentration within said furnace;

(c) determining whether upper furnace temperature, hot zone temperature, and sulfur dioxide concentration within said furnace is increasing, decreasing or is substantially unchanged;

(d) using said determinations to calculate a composite state variable;

(e) correlating said composite state variable with a said predetermined response; and (f) carrying out said predetermined response correlating to said composite state variable.

12 Claims, No Drawings

Microfiche Appendix Included
(25 Microfiche, 1 Pages)

METHOD FOR REGULATING SULFUR DIOXIDE EMISSIONS FROM A RECOVERY FURNACE

REFERENCE TO MICROFICHE APPENDIX

The application includes a microfiche appendix pursuant to 37 C.F.R. 1.96 having one fiche with 25 frames.

BACKGROUND OF THE INVENTION

This invention relates to the control of recovery furnace of the Kraft recovery process.

In the production of paper pulp, cellulosic fibrous material, generally wood chips, is digested in an NaOH-containing solution (white liquor). This digestion yields pulp and, as a by-product, black liquor. The Kraft recovery process is widely used to recover, from the black liquor, chemicals used in the production of paper pulp and recycle these chemicals to the pulping process. Briefly, black liquor is concentrated and then combusted in the recovery furnace to produce smelt. In a dissolving tank, the smelt is dissolved in weak wash solution to form green liquor, the primary component of which is $Na_2CO_3$. The green liquor is then reacted with lime (CaO) in a causticizing reaction to convert $Na_2CO_3$ to NaOH. The reacted mixture then passes to a clarifier which separates the liquid phase, which is essentially the white liquor, from the solid phase which is primarily $CaCO_3$ and is referred to as lime mud. The white liquor is recycled and used for digestion of wood chips at the beginning of the cycle. The lime mud is washed to remove traces of white liquor prior to being passed to a lime kiln where CaO is regenerated. The overflow water from the washing of the lime mud is the weak wash used to dissolve the smelt in the dissolving tank.

The recovery furnace is an important part of the Kraft process, since the smelt produced in the furnace is the source of all recycled compounds. Efficient recovery furnace operation results in both reduced emissions and increased recovery of inorganic solids.

SUMMARY OF THE INVENTION

In general, the invention features a method for regulating sulfur dioxide emissions from the recovery furnace of a Kraft paper mill. The method includes:

(a) identifying predetermined responses, wherein each of the predetermined responses either permits or inhibits adjustment of black liquor temperature and wherein adjustment of black liquor temperature is an increase or decrease in temperature, each of the predetermined responses being associated with an increase, a decrease, or no change in upper furnace temperature, an increase, a decrease, or no change in hot zone temperature, and an increase, a decrease, or no change in sulfur dioxide concentration;

(b) periodically measuring upper furnace temperature, hot zone temperature, and sulfur dioxide concentration within the furnace;

(c) using the measurements to determine whether upper furnace temperature, hot zone temperature, and sulfur dioxide concentration within the furnace is increasing, decreasing or is substantially unchanged;

(d) using the determinations to calculate a composite state variable;

(e) correlating the composite state variable with a the predetermined response; and (f) carrying out the predetermined response correlating to the composite state variable.

The invention also features a method for regulating sulfur dioxide emissions from the recovery furnace of a Kraft paper mill. The method includes:

(a) storing predetermined responses, wherein each response either permits or inhibits adjustment of black liquor temperature and wherein adjustment of black liquor temperature is an increase or decrease in temperature;

(b) storing a table which correlates the predetermined responses with permissible values of a composite state variable;

(c) periodically measuring upper furnace temperature, hot zone temperature, and sulfur dioxide concentration within the furnace;

(d) recording the measurements;

(e) periodically calculating an average upper furnace temperature, an average hot zone temperature, and an average sulfur dioxide concentration from the recorded measurements (f) storing the periodically calculated averages;

(g) applying a derivative test to the stored periodically calculated averages to determine whether each of the average upper furnace temperature, average hot zone temperature, and average sulfur dioxide concentration within the furnace is increasing, decreasing or is substantially unchanged;

(h) storing the results of the derivative tests as a composite state variable;

(i) determining via the table which of the predetermined responses correlates with the composite state variable;

(j) carrying out the predetermined response correlating to the composite state variable.

In a preferred embodiment, for each response permitting a black liquor temperature increase, the increase is the same, and for each response permitting a black liquor temperature decrease, the decrease is the same.

In alternative embodiments, the predetermined responses either permit or inhibit adjustment (an increase or decrease) of black liquor viscosity. In a preferred embodiment, viscosity is increased by decreasing black liquor temperature and viscosity is decreased by increasing black liquor temperature.

DESCRIPTION OF THE PREFERRED EMBODIMENTS

Recovery Furnace Operation

In one of the first steps in the Kraft recovery process, black liquor, composed primarily of water, lignin and inorganic salts is concentrated, heated to several hundred degrees, usually by a heat exchanger, and then sprayed into the recovery furnace. Within the furnace the liquor droplets are heated, and the following events take place: water evaporates, pyrolysis occurs generating carbon dioxide, hydrogen sulfide and sulphur dioxide, finally hydrocarbons in the droplet burn generating sufficient heat to melt the sodium sulphate and sodium carbonate present in the droplet. The inorganic salts formed during this process fall to the furnace bed generating a molten slag or smelt which is drawn off for chemical recovery. During this process sulphur gases combine with gaseous sodium to produce sodium sulphate which falls to the bed of the furnace. Any gases which are not consumed in this manner escape up the flue. In an efficient furnace, very little gas escapes up the flue.

In most cases, high emission levels are due to either the black liquor having an excessively high ratio of sulfur to sodium or to the temperature at the furnace bed being too low. Because the black liquor sulfur to sodium ratio generally cannot be independently adjusted, control of furnace bed temperature is an important method for increasing furnace efficiency and reducing emissions.

The method of the invention reduces sulfur emissions and increases furnace efficiency by regulating black liquor temperature or furnace air feed in response to changes in sulfur dioxide concentration, upper furnace temperature, and furnace bed temperature. For example, if the sulphur dioxide concentration is high and both the sulphur dioxide concentration and upper furnace temperature are increasing and the lower furnace temperature is decreasing, the method of the invention would lower the temperature of the black liquor being sprayed into the furnace. As liquor temperature decreases liquor viscosity and droplet size increase, the rate of water evaporation from the droplet decreases and the rate of pyrolysis decreases. As a result, the black liquor droplets continue to burn even when they are very close to the furnace bed; this increases furnace bed temperature. Increased furnace bed temperature leads to increased generation of sodium gas. Under these circumstances there is more sodium available to combine with the increased level of sulfur dioxide and more sulfur dioxide is consumed to form sodium sulphate. Consequently sulfur dioxide levels and emissions are reduced. Further more sodium sulfate is available for recycling by conversion to $Na_2S$. As an alternative to decreasing black liquor temperature the method of the invention might, under the above-described conditions increase air feed to the lowest part of the furnace (primary air feed) and decrease feed to the middle level of the furnace (secondary air feed). The effect of these adjustments on furnace bed temperature would be similar to the decreasing black liquor temperature.

It is useful to briefly consider why appropriate control of furnace air feed or black liquor temperature will increase furnace efficiency.

Furnace air feed directly influences the rate of water evaporation from black liquor droplets, the intensity of hydrocarbon burning, furnace bed shape, and furnace bed temperature distribution. Generally, air is fed into the furnace at three levels. The primary air feed is near the bottom of the furnace; the secondary air feed is well below the middle of the furnace (and the black liquor guns); and the tertiary air feed is near the top of the furnace. The precise effect of changes in air flow cannot always be predicted. For example, while in most cases increasing the air flow to the lower furnace will increase burning intensity, very high flow rates will sometimes have the opposite effect. Accordingly, it is preferred that the rules for adjusting air flow and black liquor temperature in response to changes in sulfur dioxide concentration, upper furnace temperature and bed temperature be customized for a particular furnace. Since it is generally desirable that the total furnace air feed remain constant, increased primary air feed will be accompanied by decreased secondary air feed.

The importance of controlling black liquor temperature is due to the fact that liquor temperature is inversely proportional to liquor viscosity. Viscosity has a direct impact on the size of the droplets sprayed into the furnace, and droplet size has a significant impact on drying time and flight time, both of which can significantly impact furnace operation. For example, the smaller the droplet, the greater the tendency for premature burning high in the furnace, well above the furnace bed, resulting in furnace bed cooling. If the droplet size is too great, some phases of combustion will not be completed before the droplet reaches the bed. This incomplete combustion will also decrease bed temperature.

Of course, liquor temperature is not the only determinant of liquor viscosity. Black liquor can be thought of as a mixture of solids and water. In this mixture an increase in the percentage of solids will increase the liquor viscosity.

Further, it will be recognized that viscosity is not the only factor influencing droplet size. The diameter of the gun used to spray liquor into the furnace, the liquor pressure in the gun, the percentage of solids in the liquor, and the composition of solids in the liquor all have an impact on droplet size.

Despite the number of factors influencing the characteristics of the black liquor droplets, it is expected that by controlling one independent external influence, e.g., liquor viscosity by way of temperature, it will be possible to compensate for changes in droplet size caused by such factors as liquor pressure and percentage solids.

Overview of the Control System

The method of the invention adjusts black liquor temperature or furnace air flow in response to trends in furnace sulfur dioxide concentration, hot zone temperature (the temperature just above the furnace bed) and upper furnace temperature with the object reducing furnace emissions and increasing recovery efficiency. Importantly, the direction, if any, of change in each of the measured variables, rather than their absolute values, are used to control black liquor temperature or furnace air feed. The three measured variables processed for unchanged, increased or decreased status generate 27 different rules for controlling black liquor temperature or furnace air feed. This arrangement reduces the need for very accurate measurement of the variables used to control furnace operation.

In most cases the primary object is reduction in sulfur dioxide emissions. Accordingly, only when the sulfur dioxide level rises above a preset threshold value will the method of the invention be used to adjust black liquor temperature or furnace air feed. When the sulfur dioxide concentration is below the threshold value changes in sulfur dioxide emission, hot zone temperature and upper furnace temperature are monitored, but no action is taken to adjust black liquor temperature or furnace air feed.

When a change in black liquor temperature (or furnace air feed) is called for, a predetermined change is made and any further optimization is blocked for a predetermined period so that the effect of the change on furnace operation can be monitored. After a predetermined time the control system is again allowed to adjust black liquor temperature (or furnace air feed) in response to the pattern of change in sulfur dioxide concentration, hot zone temperature and upper furnace temperature.

The above discussion has focused on adjusting black liquor temperature; however the method can just as easily be used to adjust primary and secondary furnace air feed. The nature of a given installation determines whether it will more efficient to regulate black liquor temperature or furnace air flow. However, the choice may also vary over a given set of 27 rules for a given installation.

Example: Control System with Regulation of Liquor Temperature

Three variables are measured: lower furnace temperature, sulfur dioxide concentration, and upper furnace temperature. Each of these analog inputs is filtered by the time constant in the analog interface for graphical indication and alarming purposes. The inputs are further filtered in the sequence block by first order lags which provide for additional smoothing. The filtered values are sent to real outputs for diagnostic and trending purposes.

The algorithm includes an independent sequence block that samples each of the three variables every 5 minutes for a period of one hour and stores the resulting 12 measurements for each variable in an array. For each variable the 12 array elements are averaged every 5 minutes. The averages are stored in 12 additional array elements for use by a trend calculator. Generally, the results of the two most recent moving averages for each variable are stored in two real outputs and used to determine the trend in that variable. The calculation is a simple difference between the present average and an earlier average. As stated above, in many instances the earlier average is the earlier of the two most recent averages. However, depending on the response time or settling time of the variable, it may be preferable to use an average that is older. In the above described system averages that are one hour old or less are stored and available for use.

The trend calculator reads a pair of moving averages and determines one of three possible states for the variable: up, down, or no change. The criteria for "no change" includes an adjustable dead zone so that minor fluctuations can be ignored. The information generated by the trend calculator is converted into an address for a 3×3×3 pattern table. In the pattern table, rules for the control of up to three manipulated variables can be stored; however, normally only two manipulated variables, liquor temperature and air flow, are used.

The 27 rules are encoded as integers from 1 to 27. The 5 bits in an integer word representing the prescribed response are then unpacked and inserted as boolean values in a block storage location. One bit determines whether air feed can be adjusted, a second bit determines whether primary air feed is increased and secondary air feed is decreased or primary air feed is decreased and secondary air feed is increased, a third bit determines whether liquor temperature can be adjusted, a fourth bit determines whether black liquor temperature is increased or decreased. Up to three tunable ramp generators can be controlled by the bit values from the unpacked booleans. The ramp generators adjust the setpoint of the liquor temperature and the air flow over a limited range.

Of course it is not required that both air feed and liquor temperature be adjusted. For some furnaces none of the rules will permit adjustment of air feed. For other furnaces none of the rules will permit adjustment of liquor temperature.

Actual furnace operations are tracked to set the rules table and the sensitivity of the trend calculator (i.e., the size of the dead zone). In this manner the rules table can be customized for a particular installation.

While the rules table provides for response to 27 different conditions, it should be realized that some conditions will not require any response and other conditions may invoke the same response. Further, some conditions will be inconsistent with normal furnace operation (e.g., lower furnace temperature, sulfur dioxide concentration, and upper furnace temperature all increasing) and may be caused by sensor failure. Such conditions will be alarmed for operator diagnosis.

Conditions Under Which Optimization Will Be Suspended

Permissive Logic and Alarming

The control system can be design so that certain conditions will inhibit optimization. Such an interlock can include an independent sequence block that controls the other sequence blocks downstream. It can also generates alarm messages in both a hardcopy and a graphical format.

The following is a list of interlocks that will inhibit the optimization:
—Liquor temperature optimization not selected
—CO controller active
—Auxiliary fuel on
—Total solids control not in automatic
—Sulfur dioxide below preset limit
—Sulfur dioxide measurement not OK
—Furnace pyrometer not OK
—Sootblowing started
—Liquid temperature not automatic
—Liquid temperature in local set
—Liquor viscosity in local set
—Viscosity setpoint at either extreme Under any of these conditions the optimizer will preferably be disabled. The moving average will continue to gather and historize data, but no further control action will be taken. The ramp generators will hold at that last value.

The initial stages of sootblowing is an exception to this general rule. During this period sulfur dioxide can read artificially high due to analyzer errors caused by dilution of the flue gas with water and/or large temperature excursions. When that particular phase occurs, measured moving average arrays in the signal conditioner will be put on hold and the optimizer disabled until the upset due to sootblowing subsides (adjustable time setting). Further, when the unwanted transient event ends, the moving averages and optimizer will resume as if the upset had not occurred (i.e., that part of the measurement history will be removed).

Option for Control of Liquor Viscosity

Under some circumstances it may be desirable to regulate and adjust black liquor viscosity rather than temperature. As discussed above, viscosity has a substantial influence on droplet size and therefore pyrolysis rate. When the control system calls for increased viscosity, black liquor temperature is decreased. When the control system calls for decreased viscosity, black liquor temperature is increased. Because external factors (e.g., percent solids) influence viscosity, there is no direct relationship between viscosity and temperature. Accordingly, measurements of viscosity can be used to adjust the temperature setpoints. In addition, certain external factors can be measured and used to adjust the temperature set point. For example, as pressure increases, particle size decreases. Under these circumstances it is often desirable to increase black liquor viscosity by increasing liquor temperature. Thus, when the pressure increases the temperature setpoint can be increased. Increased solids in the black liquor has the opposite effect on particle size. Thus, when percent solids increases, it is often desirable to increase black liquor temperature to decrease liquor viscosity and the temperature setpoint can be decreased.

Measurements

Some of the measurements used for the algorithm require frequent maintenance and will perform optimally only when a regular cleaning and calibration program is in effect. This is especially true of the sulfur dioxide analyzer and furnace bed temperature pyrometers.

Black Liquor Pressure The pressure at the liquor guns needs to be reliably measured and indicated. Care must be taken on the installation of the pressure tap such that solids particles are not allowed to accumulate in the tap. Preferably only a flush mounted diaphragm or a pneumatic repeater is used. Pressure at the entrance to the ring header is used for the control variable. Although there may be some filtering applied at the analog interface additional filtering is required by the optimization program.

Black Liquor Percent Solids The refractive index meters supplied for total solids control are used for this application and installed according to manufacturer's recommendations. Refractometer purge status and alarm status are required in the digital control system.

Black Liquor Temperature Preferably the probe should be located close to the guns at a central location. For tuning of automatic controls, it preferred that the probe be located close to the heater discharge (when indirect heaters are used) assuming velocities of 2 to 10 ft/s. In cases where direct heaters are used, the distance between heater and sensor may have to be greater.

Sulfur Dioxide (Wet Sample Analyzer) From a maintenance standpoint it is preferable to measure sulfur dioxide downstream of the precipitator using the environmental reporting sensors. At a minimum, gas concentration will require correction for infiltration air, flue gas moisture and temperature as a minimum. Oxygen correction (wet sample) will account for infiltration air if measured at the gas analyzer. Flue gas moisture will account for volume errors introduced by sootblowing or water content variations in the fuel. Moisture errors due to measurement sensitivity to interferences gases can be corrected at the gas analyzer. It is assumed that volume errors due to gas temperature variations are corrected at the gas analyzer micro, however, gas temperature correction is included in the algorithm as an option. In the specific program described herein it is assumed that because of sensor location, particulate interference is not a problem. There is provision in the software to suspend measurement and control during the initial stages of sootblowing if required. Correction is provided for fuel composition and HHV. The engineering units will be lb/MMBTU.

Superheater Inlet Gas Temperature and East/West Hot Zone Temperature The preferred sensors for measuring lower furnace temperature are pyrometers manufactured by E² Technology. They are sighted in a horizontal plane about 1-2 feet above the bed. Automatic cleaner assembly should be mounted such that the sight tube extends past the inner surface of the furnace wall by about 4-6 inches. The sensor is preferably the "BT" type.

Liquor Viscosity When it is desirable to monitor and regulate liquor viscosity, the meter is preferably mounted in a small recirculation tank just downstream of the gun header. This avoids the possibility that a partial obstruction in the liquor piping could possibly block the line.

Sulfur Control The following equation can be used to calculate the sulfur dioxide concentration on a lb/million BTU basis:

$$E = C_w F_d \times 20.9/[(20.9(1-B_w)-\% O_{2w})]$$

where:
E is the emission rate in lb/MMBTU
$C_w$ is the pollutant concentration in lb/dscf
$F_d$ is the fuel factor (dry)
$C_w$ = ppm $\times$ [(MW#/#-mole)/((359.05 ft³/#-mole) $\times (T_a/T_o)$)]/1000000
Note: Pressure effects ignored in this region.
$F_d = KE \times [(K_{hd} \times \% H) + (K_c \times \% C) + (D_s \times \% S) + (K_n \times \% N) - (K_o \times \% O_2)]/GCV$, where % H, % C, % S, % N, and % $O_2$ are, respectively, the percentages of hydrogen, carbon, sulfur, nitrogen, and oxygen gas
$B_w$ = the fraction of water in the material and has a value from 0 to 1.0
MW = mol wt of sample gas
R = gas constant = 1545
$T_o$ = reference temperature (460 deg F.)
$T_a$ = actual gas temperature in deg R
K = 1000000
$K_{hd}$ = 3.64 scf/lb/%
$K_c$ = 1.53 scf/lb/%
$K_s$ = 0.57 scf/lb/%
$K_n$ = 0.14 scf/lb/%
$K_o$ = 0.46 scf/lb/%
$K_w$ = 0.21 scf/lb/%
GCV = gross calorific value
$O_{2w} = O_2$ measured on a wet basis
Note that all corrections and compensations can be disabled for testing purposes by setting an internal flag (corr_req) to False. Inputs for GCV, and fuel analysis are manual data entry points and connected to performance calculation sequence block.

What is claimed is:

1. A method for regulating sulfur dioxide emissions from a recovery furnace of a Kraft paper mill comprising:
   (a) storing predetermined responses, wherein each of said predetermined responses either permits or inhibits adjustment of black liquor temperature and wherein adjustment of black liquor temperature affects sulfur dioxide emissions from the recovery furnace of the Kraft paper mill;
   (b) correlating said predetermined responses with permissible values of a composite state variable that reflects the change in the upper furnace temperature, hot zone temperature, and sulfur dioxide concentration;
   (c) periodically measuring upper furnace temperature, hot zone temperature, and sulfur dioxide concentration within said furnace;
   (d) based on said measurements, determining whether each of said upper furnace temperature, hot zone temperature, and sulfur dioxide concentration within said furnace is in a increasing state, a decreasing state or a substantially unchanged state;

(e) storing the states of said upper furnace temperature, hot zone temperature, and sulfur dioxide concentration as a composite state variable;

(f) selecting one of said predetermined responses, said selected predetermined response corresponding to said composite state variable; and (g) carrying out said selected predetermined response.

2. The method of claim 1 wherein for each of said predetermined responses permitting a black liquor temperature increase, the increase is the same, and wherein for each of said predetermined responses permitting a black liquor temperature decrease, the decrease is the same.

3. The method of claim 1, further comprising storing a table which correlates said predetermined responses with permissible values of a composite state variable that reflects the change in the upper furnace temperature, hot zone temperature, and sulfur dioxide concentration, and wherein said step of selecting one of said predetermined responses comprises selecting one of said predetermined responses from said table.

4. A method for regulating sulfur dioxide emissions from a recovery furnace of a Kraft paper mill comprising:

(a) storing predetermined responses, wherein each of said predetermined responses either permits or inhibits adjustment of black liquor viscosity and wherein adjustment of black liquor viscosity affects sulfur dioxide emissions from the recovery furnace of the Kraft paper mill;

(b) correlating said predetermined responses with permissible values of a composite state variable that reflects the change in the upper furnace temperature, hot zone temperature, and sulfur dioxide concentration;

(c) periodically measuring upper furnace temperature, hot zone temperature, and sulfur dioxide concentration within said furnace;

(d) based on said measurements, determining whether each of said upper furnace temperature, hot zone temperature, and sulfur dioxide concentration within said furnace is in a increasing state, a decreasing state or a substantially unchanged state;

(e) storing the states of said upper furnace temperature, hot zone temperature, and sulfur dioxide concentration at a composite state variable;

(f) selecting one of said predetermined responses from said table, said selected predetermined response corresponding to said composite state variable; and (g) carrying out said selected predetermined response.

5. The method of claim 4 wherein said black liquor viscosity is decreased by increasing black liquor temperature and said black liquor viscosity is increased by decreasing black liquor temperature.

6. The method of claim 4, further comprising storing a table which correlates said predetermined responses with permissible values of a composite stage variable that reflects the change in the upper furnace temperature, hot zone temperature, and sulfur dioxide concentration, and wherein said step of selecting one of said predetermined responses comprises selecting one of said predetermined responses from said table.

7. A method for regulating sulfur dioxide emissions from a recovery furnace of a Kraft paper mill comprising:

(a) storing predetermined responses, wherein each of said predetermined responses either permits or inhibits adjustment of black liquor temperature and wherein adjustment of black liquor temperature affects sulfur dioxide emissions from the recovery furnace of the Kraft paper mill;

(b) correlating said predetermined responses with permissible values of a composite state variable that reflects the change in the average upper furnace temperature, average hot zone temperature, and average sulfur dioxide concentration;

(c) periodically measuring upper furnace temperature, hot zone temperature, and sulfur dioxide concentration within said furnace;

(d) recording said measurements;

(e) periodically calculating an average upper furnace temperature, an average hot zone temperatures, and an average sulfur dioxide concentration from said recorded measurements (f) storing said periodically calculated averages;

(g) applying a derivative test to said stored periodically calculated averages to determine whether each of said average upper furnace temperature, average hot zone temperature, and average sulfur dioxide concentration within said furnace is in a increasing state, a decreasing state or a substantially unchanged state;

(h) storing the states of said average upper furnace temperature, average hot zone temperature, and average sulfur dioxide concentration as a composite state variable;

(i) selecting one of said predetermined responses, said selected predetermined response corresponding to said composite state variable; and (j) carrying out said selected predetermined response.

8. The method of claim 7 wherein for each of said predetermined responses permitting a black liquor temperature increase, the increase is the same, and wherein for each of said predetermined responses permitting a black liquor temperature decrease, the decrease is the same.

9. The method of claim 7, further comprising storing a table which correlates said predetermined responses with permissible values of a composite state variable that reflects the change in the average upper furnace temperature, average hot zone temperature, and average sulfur dioxide concentration, and wherein said step of selecting one of said predetermined responses comprises selecting one of said predetermined responses from said table.

10. A method for regulating sulfur dioxide emissions from a recovery furnace of a Kraft paper mill comprising:

(a) storing predetermined responses, wherein each of said predetermined responses either permits or inhibits adjustment of black liquor viscosity and wherein adjustment of black liquor viscosity affects sulfur dioxide emissions from the recovery furnace of the Kraft paper mill;

(b) correlating said predetermined responses with permissible values of a composite state variable that reflects the change in the average upper furnace temperature, average hot zone temperature, and average sulfur dioxide concentration;

(c) periodically measuring upper furnace temperature, hot zone temperature, and sulfur dioxide concentration within said furnace;
(d) recording said measurements;
(e) periodically calculating an average upper furnace temperature, an average hot zone temperature, and an average sulfur dioxide concentration from said recorded measurements
(f) storing said periodically calculated averages;
(g) applying a derivative test to said stored periodically calculated averages to determine whether each of said average upper furnace temperature, average hot zone temperature, and average sulfur dioxide concentration within said furnace is increasing, decreasing or is substantially unchanged;
(h) storing the states of said average upper furnace temperature, average hot zone temperature, and average sulfur dioxide concentration as a composite state variable;
(i) selecting one of said predetermined responses, said selected predetermined response corresponding to said composite state variable; and
(j) carrying out said selected predetermined response.

11. The method of claim 10 wherein said black liquor viscosity is decreased by increasing black liquor temperature and said black liquor viscosity is increased by decreasing black liquor temperature.

12. The method of claim 10, further comprising storing a table which correlates said predetermined responses with permissible values of a composite state variable that reflects the change in the average upper furnace temperature, average hot zone temperature, and average sulfur dioxide concentration, and wherein said step of selecting one of said predetermined responses comprises selecting one of said predetermined responses from said table.

* * * * *

UNITED STATES PATENT AND TRADEMARK OFFICE
CERTIFICATE OF CORRECTION

PATENT NO.   : 5,419,812

DATED        : May 30, 1995

INVENTOR(S)  : Allen W. Beal

It is certified that error appears in the above-identified patent and that said Letters Patent is hereby corrected as shown below:

```
Cover Page, column 2, last line "1 Pages" should be
--1 Page--.
Column 1, line 65, replace "determinations" with
--determined states of the upper furnace temperature, hot
zone temperature, and sulfur dioxide concentration--.
Column 1, line 67, delete "the" (2nd occurrence)
Column 2, line 41, "embodiements" should be --embodiments--.
Column 5, line 1, after "will", insert --be--.
Column 5, line 39, before "information", insert --state--.
Column 5, line 40, after "into", insert --a composite state
variable representing--.
Column 7, line 20, "solids" should be --solid--.
Column 9, line 50, "at" should be --as--.
Column 10, claim 7, line 20, "temperatures" should be
--temperature--.
```

Signed and Sealed this

Tenth Day of September, 1996

Attest:

BRUCE LEHMAN

*Attesting Officer*         *Commissioner of Patents and Trademarks*